United States Patent [19]

Williams

[11] 4,217,755
[45] Aug. 19, 1980

[54] COOLING AIR CONTROL VALVE

[75] Inventor: James R. Williams, Martinsville, Ind.

[73] Assignee: General Motors Corporation, Detroit, Mich.

[21] Appl. No.: 966,068

[22] Filed: Dec. 4, 1978

[51] Int. Cl.³ .............................................. F02C 7/18
[52] U.S. Cl. ................................. 60/39.75; 415/115; 415/116; 415/175; 416/95
[58] Field of Search .......................... 60/39.66, 39.75; 415/115, 116, 175; 416/95, 97 A, 97 R

[56] References Cited

U.S. PATENT DOCUMENTS

| | | | |
|---|---|---|---|
| 2,598,176 | 5/1952 | Johnstone | 416/95 |
| 2,951,340 | 9/1960 | Howald | 416/95 |
| 3,452,542 | 7/1969 | Saferstein et al. | 415/115 |
| 3,515,206 | 6/1970 | Ward et al. | 415/115 |
| 3,575,528 | 4/1971 | Beam et al. | 415/115 |
| 3,632,221 | 1/1972 | Uehling | 415/115 |
| 3,712,756 | 1/1973 | Kalikow et al. | 415/115 |
| 3,736,069 | 5/1973 | Beam et al. | 415/115 |
| 3,972,181 | 8/1976 | Swayne | 415/115 |
| 3,989,410 | 11/1976 | Ferrari | 415/115 |
| 4,019,320 | 4/1977 | Redinger et al. | 60/39.66 |

FOREIGN PATENT DOCUMENTS

| | | | |
|---|---|---|---|
| 1059718 | 6/1959 | Fed. Rep. of Germany | 416/95 |
| 46-43565 | 12/1971 | Japan . | |
| 877127 | 9/1961 | United Kingdom | 416/95 |

Primary Examiner—Robert E. Garrett
Attorney, Agent, or Firm—J. C. Evans

[57] ABSTRACT

An air cooled gas turbine engine includes a coolant flow control valve for regulating flow of compressor discharge air to a turbine rotor in accordance with compressor discharge pressure and the operating temperature of an air cooled turbine component of the engine and wherein the coolant flow control valve is associated with a seal having a fixed stator member connected to a compressor frame and a movable labyrinth seal rotor driven in response to gas turbine engine operation to seal between high and low pressure regions; the coolant flow control valve including a pressurizable chamber formed by the stator member and an annular member secured between the stator member and a movable leaf spring valve element that is subjected to compressor discharge pressure to close the valve element at engine cruise conditions and wherein means are provided responsive to temperature of the turbine component to bleed the pressurizable chamber to cause the bellows to bias the valve element into an open position thereby to modulate coolant flow.

2 Claims, 3 Drawing Figures

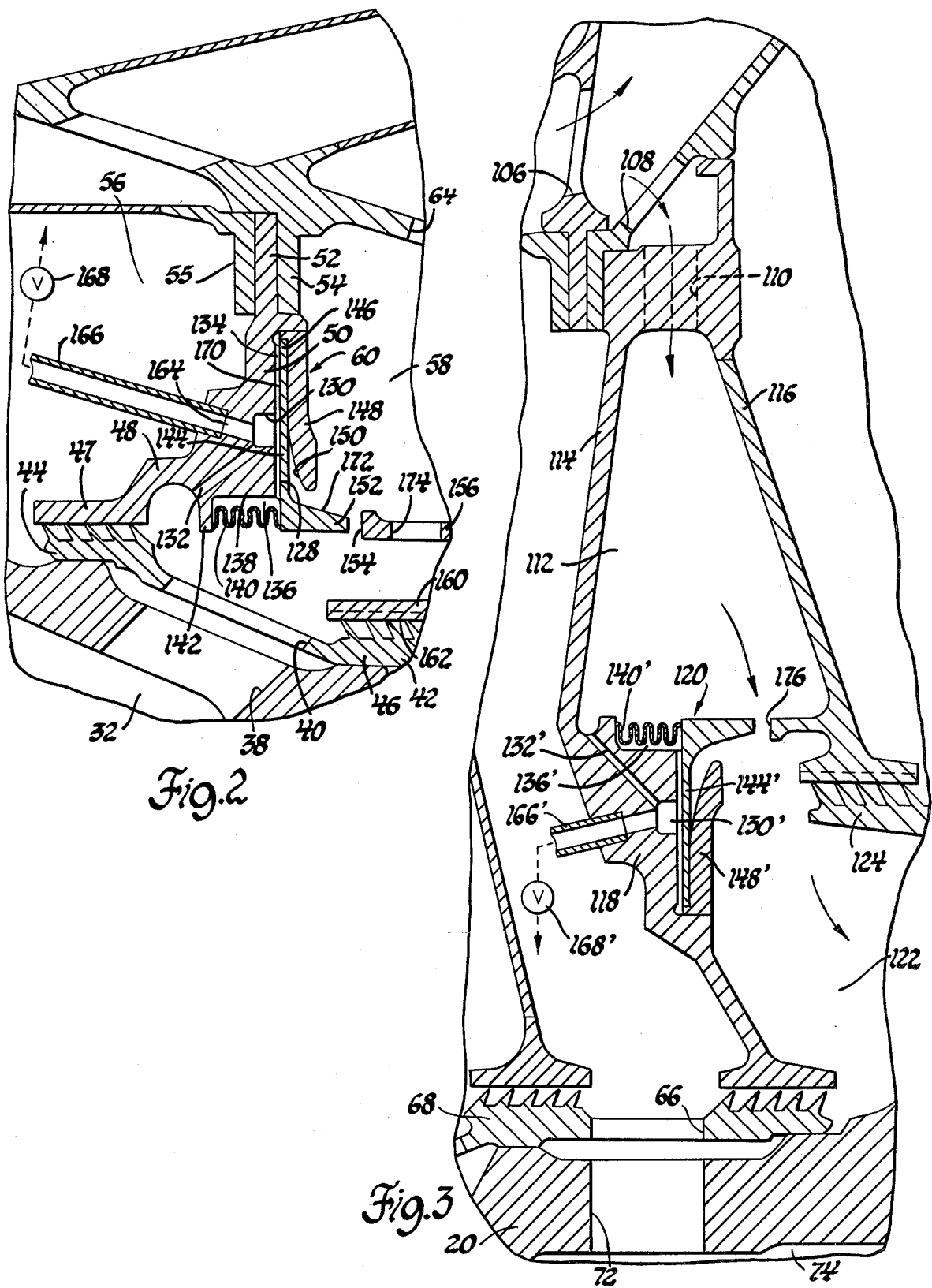

COOLING AIR CONTROL VALVE

This invention relates to gas turbine engine cooling systems and more particularly to an improved coolant flow control valve associated with a seal of a gas turbine engine to modulate flow of cooling air to regulate the operating temperature of operating components of a gas turbine engine.

High performance gas turbine engines for use in aircraft and in industrial gas turbine engine applications are operating at ever increasing turbine inlet temperatures in order to meet desired power performance and fuel economy goals.

Under such elevated temperatures of operation, gas turbine engine components, for example, turbine rotors and blade components thereon are cooled by flow of coolant such as compressor discharge air. The flow of coolant across the operating turbine component removes heat therefrom so as to prevent excessive reduction in its mechanical strength properties.

An example of one arrangement for cooling such gas turbine engines is set forth in U.S. Pat. No. 3,575,528 issued Apr. 20, 1971 to Beam, Jr. In this air cooling system compressor discharge air is directed with respect to rotating wheel and blade components of the engine under the control of thermally responsive bimetal valves that increase the flow of turbine cooling air to the wheel and blade components in response to temperature increases in the cooling air gas flow through the gas turbine engine. While such arrangements are suitable for their intended purpose, in some engine applications, such controls bypass an excessive amount of the total gas flow through the gas turbine engine.

As a result, an improved cooling air coolant control valve system has been proposed that is dependent upon the temperature characteristics of the engine part to be cooled. The flow control valve is responsive to the operating temperature of the cooled part and the valve continuously modulates coolant flow to prevent excessive bypass of total gas flow through the gas turbine engine for purposes of cooling the turbine components. Such an arrangement is set forth in my copending U.S. application Ser. No. 879,782 filed Feb. 21, 1978 for Cooling Air Control Valve, with a common assignee.

An object of the present invention is to provide an improved cooling control valve that is readily incorporated in component parts of existing structure of a gas turbine engine and further including an annular seal and a cavity in a seal stator that communicate with a source of pressurized cooling air and a bleed valve system connected to a temperature responsive means for sensing the temperature of operating components of the gas turbine engine thereby to modulate the position of an annular valve element with respect to a fixed valve seat to prevent excessive bypass of total gas flow through the gas turbine engine.

Another object of the present invention is to provide an improved, compactly arranged coolant flow control valve assembly for use in directing coolant from the main gas flow through a gas turbine engine in bypassed relationship to a seal wherein the control valve includes a seal stator having a cavity formed therein defining a pressurizable chamber including a pair of passages directed through the stator to communicate respectively with compressor discharge pressure on one side of the seal and a bleed valve to atmosphere and wherein the pressurizable chamber forming cavity is sealed by annular, axially extending member having one end connected to the inter-stage seal strut and having an opposite end connected to the free end of an annular leaf spring member including an axially outboard extension thereon defining a valving component that is selectively engaged with and spaced to a fixed valve seat; the compressor discharge pressure passage being an orifice of a cross-sectional area to produce a pressure differential across the leaf spring member to bias it into a closed position to prevent excessive bleed of the total airflow through the engine.

Further objects and advantages of the present invention will be apparent from the following description, reference being had to the accompanying drawings wherein a preferred embodiment of the present invention is clearly shown.

FIG. 2 is a fragmentary, enlarged vertical sectional view of a flow control valve in FIG. 1; and FIG. 3 is a fragmentary enlarged vertical sectional view of a flow regulator device in FIG. 1.

Figure 1:
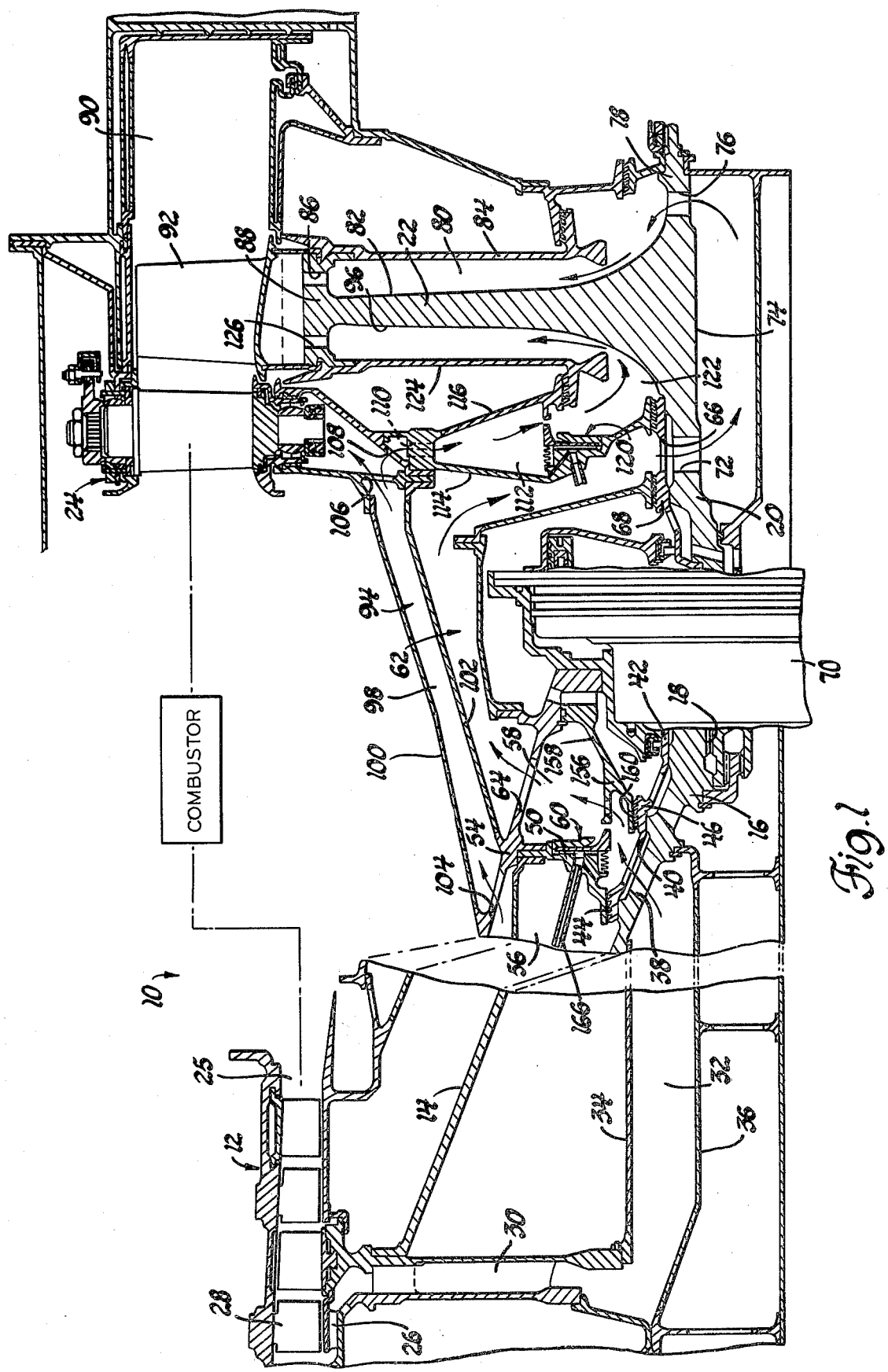
FIG. 1 is a longitudinal sectional view of a gas turbine engine including a compressor and a turbine component thereof with the improved control valve of the present invention.

Referring to the drawings, FIG. 1 shows a high performance gas turbine engine 10 including a multi-stage axial flow compressor 12 with a rotor 14 connected to a shaft 16 in the form of a conically configured rotor extension having a spline connection 18, shaft 16 and a shaft extension 20 that is formed on a rotor disc 22 of a turbine 24. Compressor 12 is operative during gas turbine engine operation to produce a flow of high compression discharge air into an outlet duct 25 that flows to a suitable combustor (in FIG. 1) for producing motive fluid for driving the turbine 24.

Moreover, the compressor 12 includes an annular scoop 26 below a stator stage 28 to direct coolant air from the compressor 12 for discharge through a passage 30 in the rotor 14. Passage 30 flows into an axially extending plenum 32 between a pair of annular axially directed and spaced walls 34, 36 of the rotor 14. Plenum 32 communicates with an opening 38 in the shaft 16 and with an opening 40 in an inter-stage seal sleeve 42 having a pair of annular labyrinth seal rotors 44, 46 thereon. The seal rotor 44 engages an annular seal stator 47 on an axial extension 48 of a combination seal and valve housing 50. The housing 50 includes a radial flange 52 thereon that is secured to the engine housing 54 to define a sealed joint 55 between housing cavities 56 and 58.

The housing cavity 58 is downstream of a valve assembly 60 constructed in accordance with the present invention and operable to selectively modulate flow of cooling air from the plenum 32 to a first fluid coolant circuit 62 including the cavity 58 thence through an opening 64 in the engine housing 54 and through an axially spaced opening 66 in an inter-stage seal sleeve 68 that is fixed on the shaft extension 20 on the opposite side of a thrust balancer and bearing assembly 70 of a type more specifically set forth in copending U.S. application Ser. No. 840,267 filed Nov. 7, 1977, U.S. Pat. No. 4,159,888, by Douglas K. Thompson for Thrust Balancing Device with the same assignee as in the present application. The opening 66 communicates with an aligned opening 72 in the shaft extension 20. Opening 72 communicates with an internal bore 74 of the wheel assembly 22 thence to a port 76 in an outboard extension 78 on the turbine 24 as best shown in FIG. 1. The port 76 communicates with a downstream compartment 80 that is bounded on one side by the downstream face 82 of disc 22 and an inter-stage seal rotor 84 to direct coolant through a plurality of coolant passages 86 formed in the rim 88 of the disc 22. Coolant circuit 62 thence terminates at the exhaust duct 90 of the engine 10 via a porous laminated turbine blade 92 such as found in U.S. Pat. No. 3,610,769 issued Oct. 5, 1972 to Schwedland for Porous Facing Attachment.

A second fluid coolant circuit 94 is utilized to cool the upstream face 96 of disc 22. More particularly this circuit includes an annular space 98 formed between a pair of internal engine walls 100, 102 having an opening 104 thereto that receives discharge air from the outlet stage of the compressor 12. The annular space 98 communicates with aligned wall openings 106, 108, 110 into a compartment 112 formed between axially spaced inter-stage seal stators 114, 116. The inter-stage stator 114 includes a combination seal and valve housing 118 thereon that forms part of a valve assembly 120 for regulating coolant flow from the compartment 112 to a downstream space 122 formed between the upstream face 96 of the turbine disc 22 and an inter-stage seal rotor 124 that is secured to the front face of the wheel rim 88. Coolant thence passes through a plurality of passages 126 in the rim 88 to cool forward parts of the turbine 24 as motive fluid is directed thereacross.

Together circuits 62, 94 thus constitute a dual supply system wherein the valve assembly 60 and the valve assembly 120 are configured to be readily located in association with seal assemblies. Furthermore, they are operative to produce a modulated flow of coolant to prevent excessive diversion of total airflow from the engine 10 during its operation for purposes of cooling the heated turbine components thereof, for example, as represented by the turbine 24.

Referring now more particularly to the valve assembly 60 the housing 50 thereof includes an annular flat face 128 thereon with an undercut cavity 130 that is selectively pressurizable by flow of fluid through an orifice bleed passage 132 in the housing 50 which is open at one end thereof to pressure within the plenum 32 and communicates at the opposite end thereof with cavity 130. The flat face 128 includes a radial groove 134 therein to define a flow relief passage from the cavity 130 to a variable volume space 136 defined between an annular axial surface 138 on the housing 50 and an annular member 140 that has one end thereof fixedly sealed to a radially inwardly directed flange 142 on the housing 50 and having the opposite end thereof sealingly connected to a free end of a leaf spring member 144 that includes a fixed end 146 thereon held in place against the housing 50 by a keeper plate 148 including a conical surface 150 thereon spaced from the leaf spring member 44 to permit a controlled axial, resilient deflection thereof from the flat face 128 of the housing 50. The leaf spring member 144 includes a valving element 152 thereon that is selectively engageable with a valve seat 154 of annular configuration formed on a cantilevered, inboard segment 156 of an inter-stage seal stator 158 that includes a second segment 160 thereon with a seal surface 162 that is in sealing engagement with the labyrinth seal rotor 46 on the inter-stage seal sleeve 42.

Additionally, the valve assembly 60 includes an exhaust port 164 in communication with the cavity 130. Port 164 connects to an exhaust tube 166 connected to a temperature responsive control valve 168 that will communicate the cavity 130 with atmosphere under certain operating phases wherein a transducer such as an infrared sensor detects an excessive temperature build-up in a gas turbine engine component such as the turbine 24. When cavity 130 is exhausted, valve assembly is conditioned to increase coolant flow. Otherwise, the valve assembly 60 maintains a reduced flow of air through the fluid coolant circuit 62 during periods where the temperature conditions of turbine 24 are sufficiently reduced so as not to require coolant. At reduced coolant flows a greater portion of the compressor discharge air can be utilized in the engine cycle thereby increasing engine operating efficiency.

More particularly, the valve assembly 60, during the low coolant phase of operation has the exhaust tube 166 closed to atmosphere. Moreover, compressor discharge pressure is directed through the bleed passage 132 so that the cavity 130 and variable volume space 136 will be charged. This will produce an increased fluid pressure on the sealed side 170 of the leaf spring member 144, incrementally greater than a downstream pressure acting on the unsealed side 172 of member 144. As a result, the leaf spring member 144 is biased away from the flat face 128 until the valving element 152 thereon seals against the seat 154. At this point in the valve operation, coolant flow is through a controlled orifice 174 in the cantilevered segment 156 of the seal stator 158.

With reference to the valve assembly 120, like components thereon to those found in the valve assembly 60 are identified with primed reference numerals. Under conditions where low coolant is required at the turbine 24, the cavity 130' of the valve assembly 120 will be pressurized through a bleed passage 132'. The leaf spring member 144' thereof will be moved to its sealed position with respect to a valve seat 176 formed on the inter-stage seal stator 116.

When greater amounts of coolant flow are required to reduce the operating temperature of the turbine 24 the control valves 168, 168' are opened to communicate the cavities 130, 130' with atmosphere. Immediately, the compressor discharge pressure acting on the member 140, 140' will deflect the member to pull the leaf spring members 144, 144' away from their respective seal seats to direct a greater quantity of coolant through the previously described fluid coolant circuits 62 and 94.

The aforedescribed coolant flow regulator valve assemblies are readily connected to existing structure of a gas turbine engine and the leaf spring member reacts to pressure changes within the cavities to adjust between a closed and open position of valve operation. The valve thereby is able to maintain minimal coolant flow to the operating components of a gas turbine engine when only less flow is required to maintain a desired temperature. As a result, reduced amounts of total engine air flow are diverted for cooling purposes as required.

As transient temperature increases occur in operating components of the engine such as the turbine 24, an immediate compensation for such temperature increase can be produced through multiple coolant circuits by systems that will directly sense the temperature of a component and adjust the pressure differential on the compactly arranged member to produce coolant flow increase without delay, while maintaining minimum bypass of coolant flow from the main gas flow passages of a gas turbine engine during other operating phases of engine operation.

While the embodiment of the present invention as herein disclosed, constitutes a preferred form, it is to be understood that other forms might be adopted.

The embodiments of the invention in which an exclusive property or privilege is claimed are defined as follows:

1. A turbine seal and coolant fuel control assembly for use in gas turbines having a coolant air bleed from a compressor discharge stage comprising: an inter-stage seal including a stator member with an annular seal surface thereon, a rotatable turbine component including a movable labyrinth seal thereon engageable with said annular seal surface to define a pressure seal, a leaf spring member including an end thereon fixedly secured to said stator member and further including a valving element thereon, a valve seat located in spaced relationship to said valving element, an annular member with axially spaced ends secured between said stator member and said leaf spring member to produce a bias thereon for moving said valving element into a spaced relationship with said valve seat to define an open flow path to said rotatable turbine component for controlling coolant air flow thereto, means including said annular member to define a pressurizable chamber between said fixed member and said leaf spring member and including means communicating with compressor discharge pressure to produce a differential pressure across said leaf spring member to bias it against the spring force of said annular member to produce sealing engagement between said valving element and said valve seat, and means to communicate said pressurizable chamber with atmosphere in response to increases in temperature of said turbine component to cause said valving element to cycle open and closed with respect to said valve seat in response to temperature conditions of said turbine component to modulate flow of cooling air to said turbine component under engine cruise conditions thereby to avoid excessive bypass of total engine air flow for cooling said turbine component.

2. A turbine seal and coolant fuel control assembly for use in gas turbines having a coolant air bleed from a compressor discharge stage comprising: an inter-stage seal including a stator member with an annular seal surface thereon, a rotatable turbine component including a movable labyrinth seal thereon engageable with said annular seal surface to define a pressure seal, a leaf spring member including an end thereon fixedly secured to said stator member and further including a valving element thereon, a valve seat located in spaced relationship to said valving element, an annular member with axially spaced ends secured between said stator member and said leaf spring member to produce a bias thereon for moving said valving element into a spaced relationship with said valve seat to define an open flow path to said rotatable turbine component for controlling coolant air flow thereto, means including said annular member to define a pressurizable chamber between said fixed member and said leaf spring member and including means communicating with compressor discharge pressure to produce a differential pressure across said leaf spring member to bias it against the spring force of said annular member to produce sealing engagement between said valving element and said valve seat, and means to communicate said pressurizable chamber with atmosphere in response to increases in temperature of said turbine component to cause said valving element to cycle open and closed with respect to said valve seat in response to temperature conditions of said turbine component to modulate flow of cooling air to said turbine component under engine cruise conditions thereby to avoid excessive bypass of total engine air flow for cooling said turbine component, said turbine component including a disc, means forming a coolant flow space on either side of said disc, first coolant circuit means including said valving element and said valve seat to control coolant flow to one of said coolant flow spaces, and second coolant circuit means including a pair of seal stators defining a chamber therebetween supplied with compressor discharge air, and valve means on one of said seal stators to control coolant air flow from said chamber to the other of said coolant flow spaces.

* * * * *